United States Patent
Kim

(10) Patent No.: US 9,545,139 B2
(45) Date of Patent: Jan. 17, 2017

(54) COVER FOR ELECTRONIC DEVICE

(71) Applicant: Samsung Electronics Co., Ltd., Gyeonggi-do (KR)

(72) Inventor: Yoon Young Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/717,439

(22) Filed: May 20, 2015

(65) Prior Publication Data

US 2015/0335115 A1    Nov. 26, 2015

(30) Foreign Application Priority Data

May 20, 2014 (KR) ........................ 10-2014-0060084

(51) Int. Cl.
  *A45C 11/00* (2006.01)
  *A45F 5/00* (2006.01)
  *B65D 5/52* (2006.01)
  *G06F 1/16* (2006.01)

(52) U.S. Cl.
  CPC ................. *A45C 11/00* (2013.01); *A45F 5/00* (2013.01); *B65D 5/5206* (2013.01); *G06F 1/1628* (2013.01); *A45C 2011/002* (2013.01); *A45C 2011/003* (2013.01); *A45C 2200/15* (2013.01)

(58) Field of Classification Search
  CPC ....... B65D 5/52; B65D 5/5206; B65D 5/2524; G06F 1/1628; G06F 1/162; A45C 11/00; A45C 2011/001; A45C 2011/002; A45C 2011/003
  USPC .......................... 206/45.2, 45.23, 45.24, 320
  See application file for complete search history.

(56) References Cited

U.S. PATENT DOCUMENTS

| | | | | |
|---|---|---|---|---|
| 4,287,986 A * | 9/1981 | Beck | ...................... | A45C 11/16 206/45.23 |
| 8,960,421 B1 * | 2/2015 | Diebel | .................. | G06F 1/1679 206/320 |
| 9,000,871 B2 * | 4/2015 | Cencioni | ............... | G06F 1/1626 206/45.2 |
| 2009/0159763 A1 * | 6/2009 | Kim | ........................ | F16M 13/00 248/174 |
| 2012/0305413 A1 * | 12/2012 | Chung | ................... | A45C 11/00 206/45.23 |
| 2013/0284615 A1 * | 10/2013 | Lee | ........................ | A45C 11/00 206/45.23 |
| 2014/0202889 A1 * | 7/2014 | Kim | ........................ | A45C 11/00 206/45.23 |
| 2015/0191273 A1 * | 7/2015 | Melmon | ................... | G06F 1/16 206/45.23 |

FOREIGN PATENT DOCUMENTS

CN     10-2448269     5/2012

* cited by examiner

*Primary Examiner* — Steven A. Reynolds
(74) *Attorney, Agent, or Firm* — The Farrell Law Firm, P.C.

(57) ABSTRACT

A cover for an electronic device with a stand function is provided. The cover is detachable from the electronic device. The cover includes a frame that is detachably coupled to the electronic device at least one of a side surface and a rear surface of the electronic device, a cover member that is rotatably connected to one side of the frame and bendable on at least one bending line included therein, and a protrusion portion that protrudes from the frame, wherein the cover member supports the electronic device at an incline, when the cover member is bent along the at least one bending line and the protrusion portion rests on an edge of the cover member.

13 Claims, 19 Drawing Sheets

COVER FOR ELECTRONIC DEVICE

PRIORITY

This application claims priority under 35 U.S.C. §119(a) of a Korean Patent Application filed on May 20, 2014, in the Korean Intellectual Property Office and assigned Serial No. 10-2014-0060084, the entire disclosure of which is incorporated herein by reference.

BACKGROUND OF THE INVENTION

1. Field of the Invention

The present invention relates generally to a cover for an electronic device, and more particularly, to an electronic device cover that is capable of standing the electronic device.

2. Description of Related Art

Although electronic devices, such as smart phones, tablet personal computers (PCs), etc, are designed to be used while held in a user's hand, there are times when it is more convenient for the electronic device to stand on end, without being held by the user, e.g., when watching movies or cooking from a displayed recipe.

Normally, to stand an electronic device, a stand unit that supports the electronic device is necessary, because the electronic device does not stand by itself. For example, by using a stand unit capable of standing the electronic device, the electronic device may be supported so as to make a predetermined tilt angle relative to a surface on which the electronic device stands.

However, conventional stand units for supporting electronic devices are generally heavy and/or bulky, often making them inconvenient to carry separately.

SUMMARY

The present invention has been made to address at least the problems and/or disadvantages described above, and to provide at least the advantages described below.

Accordingly, an aspect of the present invention is to provide an electronic device cover that is capable of detaching from an electronic device and supporting the electronic device at a predetermined tilt angle relative to a surface on which it stands.

In accordance with an aspect of the present invention, a cover for an electronic device is provided. The cover includes a frame that is detachably coupled to the electronic device at least one of a side surface and a rear surface of the electronic device, a cover member that is rotatably connected to one side of the frame and bendable on at least one bending line included therein, and a protrusion portion that protrudes from the frame, where the cover member supports the electronic device at an incline, when the cover member is bent along the at least one bending line and the protrusion portion rests on an edge of the cover member.

In accordance with another aspect of the present invention, a cover for an electronic device is provided. The cover includes a frame that is detachably coupled to the electronic device at least one of a side surface and a rear surface of the electronic device, a cover member that is rotatably connected to one side of the frame and bendable on at least one bending line included therein, and a groove portion, penetrating the frame, where the cover member supports the electronic device at an incline, when a portion of the cover member is bent along the at least one bending line basis and is inserted in the groove portion.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EMBODIMENTS OF THE PRESENT INVENTION

Figure 1:
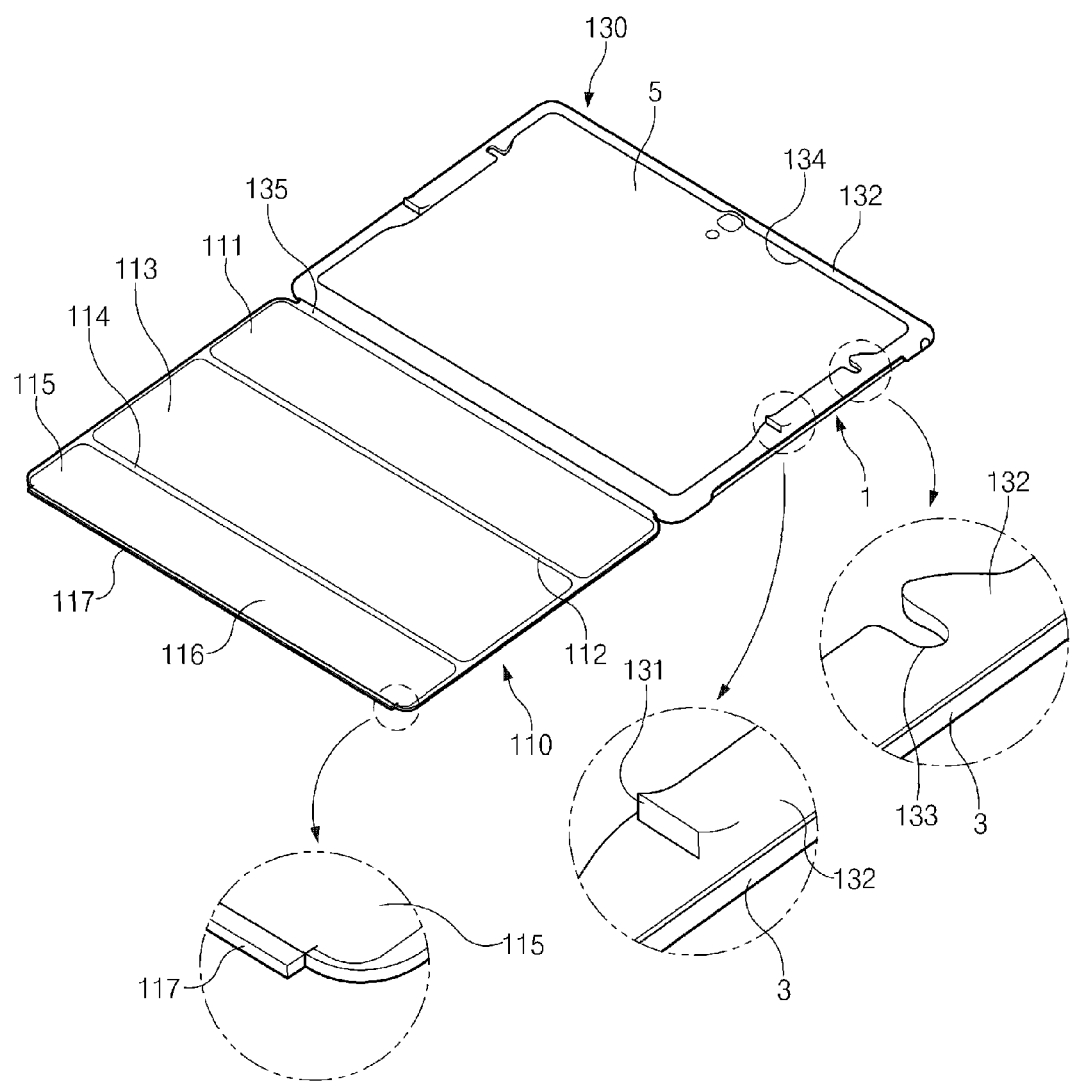
FIG. 1 is a perspective view of a cover for an electronic device, according to an embodiment of the present invention.

The following description with reference to the accompanying drawings is provided to assist in a comprehensive understanding of various embodiments of the present invention as will defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present invention. In addition, descriptions of well-known functions and constructions may be omitted for clarity and conciseness.

The term "include," "comprise," "including," or "comprising" used herein indicates disclosed functions, operations, or existence of elements but does not exclude other functions, operations or elements. It should be further understood that the term "include", "comprise", "have", "including", "comprising", or "having" used herein specifies the presence of stated features, integers, operations, elements, components, or combinations thereof but does not preclude the presence or addition of one or more other features, integers, operations, elements, components, or combinations thereof.

The meaning of the term "or" or "at least one of A and/or B" used herein includes any combination of words listed together with the term. For example, the expression "A or B" or "at least one of A and/or B" may indicate A, B, or both A and B.

The terms, such as "first", "second", and the like used herein may refer to various elements of various embodiments of the present invention, but do not limit the elements. For example, such terms do not limit the order and/or priority of the elements. Further, such terms may be used to distinguish one element from another element. For example, "a first user device" and "a second user device" indicate different user devices. For example, without departing from the scope of the present invention, a first element may be referred to as a second element, and similarly, a second element may be referred to as a first element.

In the description below, when one part (or element, device, etc.) is referred to as being "connected" to another part (or element, device, etc.), it should be understood that the former can be "directly connected" to the latter, or "electrically connected" to the latter via an intervening part (or element, device, etc.). It will be further understood that when one component is referred to as being "directly connected" or "directly linked" to another component, it means that no intervening component is present.

Terms used in this specification are used to describe embodiments of the present invention and are not intended to limit the scope of the present invention. The terms of a singular form may include plural forms unless otherwise specified.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal sense unless expressly so defined herein in the various embodiments of the present invention.

Electronic devices according to various embodiments of the present invention may include a metal case. For example, the electronic devices may include at least one of smartphones, tablet PCs, mobile phones, video telephones, electronic book readers, desktop PCs, laptop PCs, netbook computers, Personal Digital Assistants (PDAs), Portable Multimedia Players (PMPs), Motion Picture Experts Group (MPEG-1 or MPEG-2) Audio Layer 3 (MP3) players, mobile medical devices, cameras, wearable devices (e.g., Head Mounted Devices (HMDs), such as electronic glasses), electronic apparel, electronic bracelets, electronic necklaces, electronic appcessories, electronic tattoos, smart watches, etc.

According to various embodiments of the present invention, the electronic devices may be smart home appliances, including metal cases. The smart home appliances may include at least one of, for example, televisions (TVs), Digital Versatile Discs (DVDs) players, audios, refrigerators, air conditioners, cleaners, ovens, microwave ovens, washing machines, air cleaners, set-top boxes, TV boxes (e.g., Samsung HomeSync®, Apple TV®, or Google TV®), game consoles, electronic dictionaries, electronic keys, camcorders, electronic picture frames, etc.

According to various embodiments of the present invention, the electronic devices may include at least one of medical devices (e.g., a Magnetic Resonance Angiography (MRA), a Magnetic Resonance Imaging (MRI), a Computed Tomography (CT), scanners, and ultrasonic devices), navigation devices, Global Positioning System (GPS) receivers, Event Data Recorders (EDRs), Flight Data Recorders (FDRs), vehicle infotainment devices, electronic equipment for vessels (e.g., navigation systems and gyrocompasses), avionics, security devices, head units for vehicles, industrial or home robots, Automatic Teller Machines (ATMs), and Points of Sale (POS) systems, including metal cases.

According to various embodiments of the present invention, the electronic devices may include at least one of parts of furniture or buildings/structures having communication functions, electronic boards, electronic signature receiving devices, projectors, and measuring instruments (e.g., water meters, electricity meters, gas meters, and wave meters), including metal cases. The electronic devices according to various embodiments of the present invention may be one or more combinations of the above-mentioned devices.

Furthermore, the electronic devices according to various embodiments of the present invention may be flexible devices.

Additionally, it should be obvious to those skilled in the art that the electronic devices according to various embodiments of the present invention are not limited to the above-mentioned devices.

Herein, the term "user" may refer to a person who uses an electronic device or may refer to a device (e.g., an artificial electronic device) that uses an electronic device.

An electronic device cover according to an embodiment of the present invention is detachable from an electronic device having a display unit. The cover may protect at least a part of the electronic device, including the display unit, e.g., from scratches. Further, the cover supports (stands) the electronic device at a predetermined tilt angle.

Figure 2:
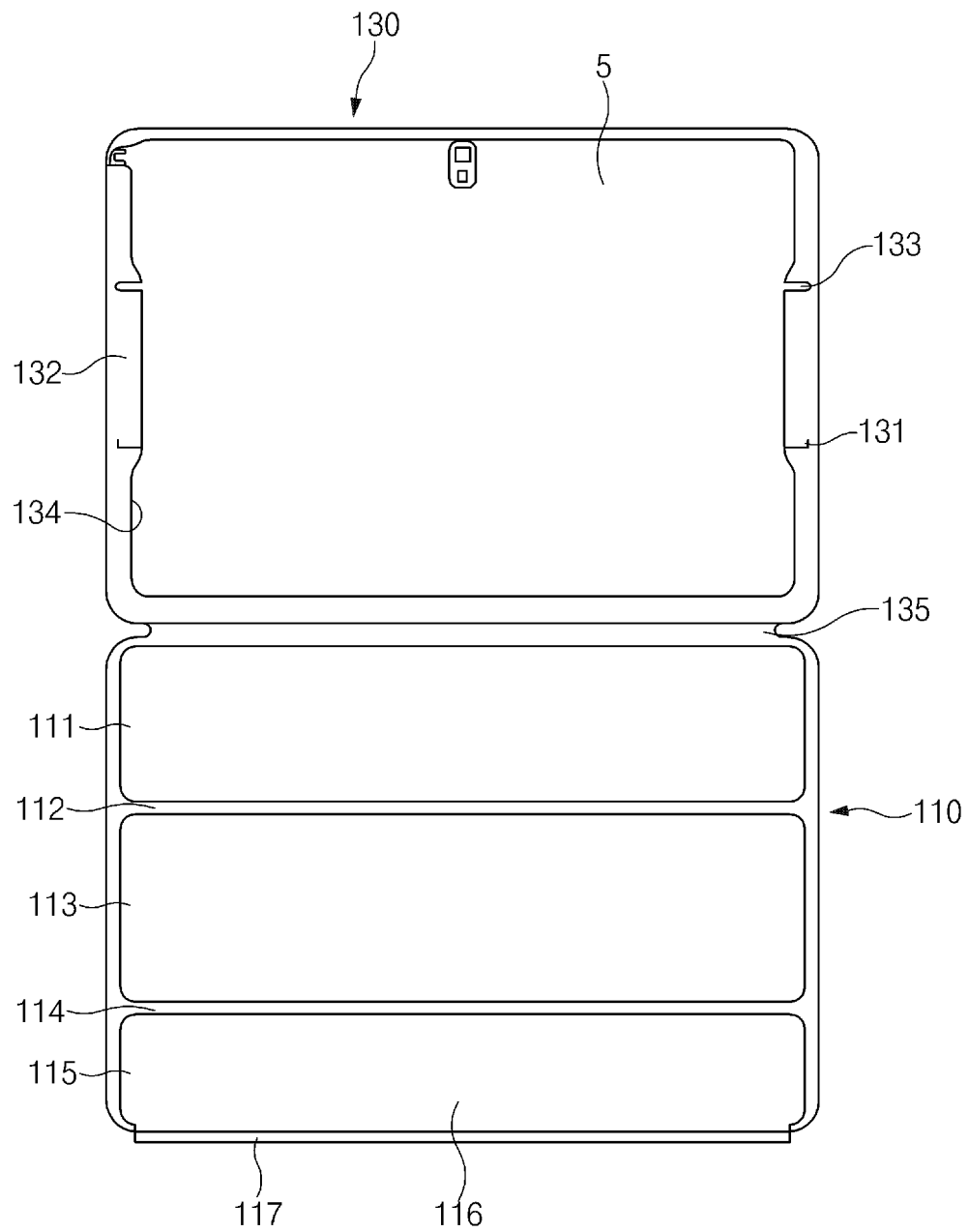
FIG. 2 is a front view of a cover for an electronic device, according to an embodiment invention.
Figure 3:
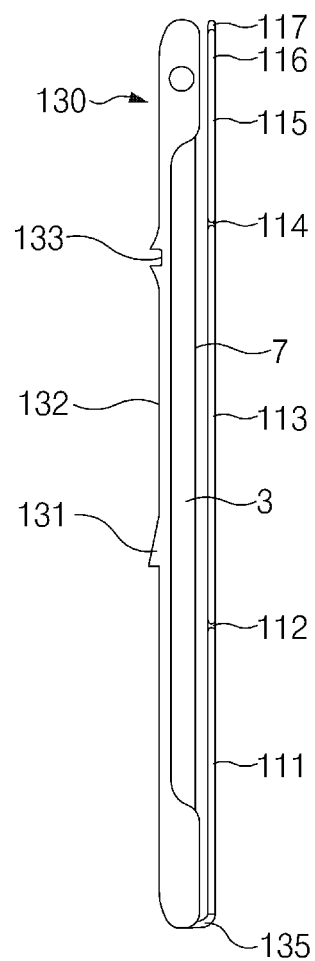
FIG. 3 is a side view of a cover member in a cover for an electronic device in a closed state, according to an embodiment of the present invention.

FIG. 1 is a perspective view of a cover for an electronic device, according to an embodiment of the present invention. FIG. 2 is a front view of a cover for an electronic device, according to an embodiment of the present invention. FIG. 3 is a side view of a cover member in a cover for an electronic device in a closed state, according to an embodiment of the present invention.

Referring to FIGS. 1 to 3, the electronic device cover includes a frame 130, a cover member 110, and a protrusion portion 131.

The frame 130 is coupled to an electronic device 1 at least one of a side surface 3 or a rear surface 5 of the electronic device 1, and is detachable from the electronic device 1.

In FIG. 1, the frame 130 is illustrated as being in contact with both the side surface 3 and the rear surface 5 of the electronic device 1. However, the frame 130 need not be in contact with both the side surface 3 and the rear surface 5 of the electronic device 1. The frame 130 may be coupled with the rear surface 5 of the electronic device 1 using an adhesive, a Velcro tape, etc.

As illustrated in FIG. 1, when the cover contracts both the side surface 3 and the rear surface 5 of the electronic device 1, the frame 130 may be mounted at the electronic device 1 more firmly.

The cover member 110 is rotatably connected to one side of the frame 130 through a connection portion 135. As illustrated in FIG. 3, the cover member 110 covers a display 7 of the electronic device 1.

Referring to FIGS. 1 and 2, the cover member 110 includes at least one bending line that is formed in a direction parallel with the connection portion 135. The cover member 110 is foldable at the bending line. In the example of FIG. 1, the cover member 110 includes two bending lines 112 and 114.

The cover member 110 also includes a first plate member 111, a second plate member 113, and a third plate member 115 that are arranged in an order away from the connection portion 135 and are separated by the two bending lines 112 and 114.

The first plate member 111, the second plate member 113, and the third plate member 115 are fairly rigid, i.e., do not bend easily, as the bending lines 112 and 114 allow the cover member 110 to be bent. Each of the first plate member 111, the second plate member 113, and the third plate member 115 may use a member having a plate shape with predetermined strength. Accordingly, the first plate member 111, the second plate member 113, and the third plate member 115 may provide support force to allow the cover member 110 to support and stand the electronic device 1.

The protrusion portion 131 protrudes from the frame 130 toward a direction away from the rear surface 5 of the electronic device 1. The protrusion portion 131 may be implemented in various shapes, and is not limited to a specific shape. The protrusion portion 131 is not be limited to a specific shape, as long as the cover member 110 can be held by the protrusion portion 131. Held by the protrusion portion 131, the cover member 110 supports the electronic device 1 in an inclined state.

In addition, when the frame 130 is in contact with both the side surface 3 and the rear surface 5 of the electronic device 1, the frame 130 includes a rear frame 132 being a portion in contact with the rear surface 5 of the electronic device 1. The rear frame 132 may have a center hole 134 that penetrates a center area of the rear frame 132.

The center hole 134 plays a role in reducing the whole weight of the electronic device cover. If being lightweight, the electronic device cover may provide convenience in being carried together with the electronic device 1 to protect the electronic device 1.

The protrusion portion 131 is disposed at both sides with the center hole 134 at the center. Even though one protrusion portion 131 is provided, the electronic device 1 can be obliquely supported because the cover member 110 is held by the protrusion portion 131. In the case where the protrusion portion 131 is arranged at both sides with the center hole 134 at the center, it may be possible to prevent the electronic device 1 from shaking, and the cover member 110 may support the electronic device 1 more firmly.

The frame 130 further includes a groove portion 133 that penetrates the rear frame 132. One side of the groove portion 133 is opened to face the center hole 134. Like the protrusion portion 131, the groove portion 133 may help in the cover member 110 supporting the electronic device 1.

The groove portion 133 is disposed at both sides with the center hole 134 at the center. In the case where the groove portion 133 is disposed at both sides with the center hole 134 at the center, it may be possible to prevent the electronic device 1 from shaking, and the cover member 110 may support the electronic device 1 more firmly.

Figure 4:
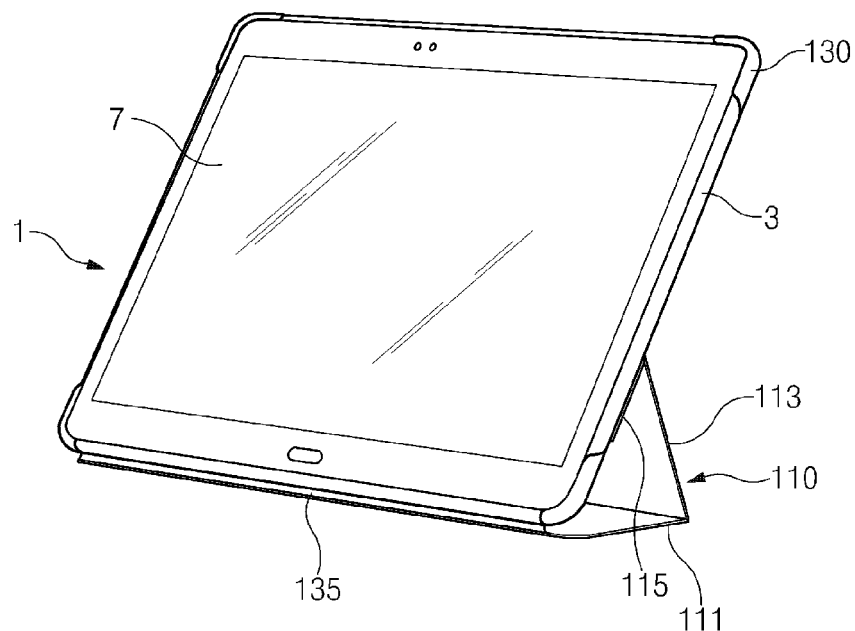
FIG. 4 is a front perspective view of an electronic device supported by a cover in a first stand mode, according to an embodiment of the present invention.
Figure 5:
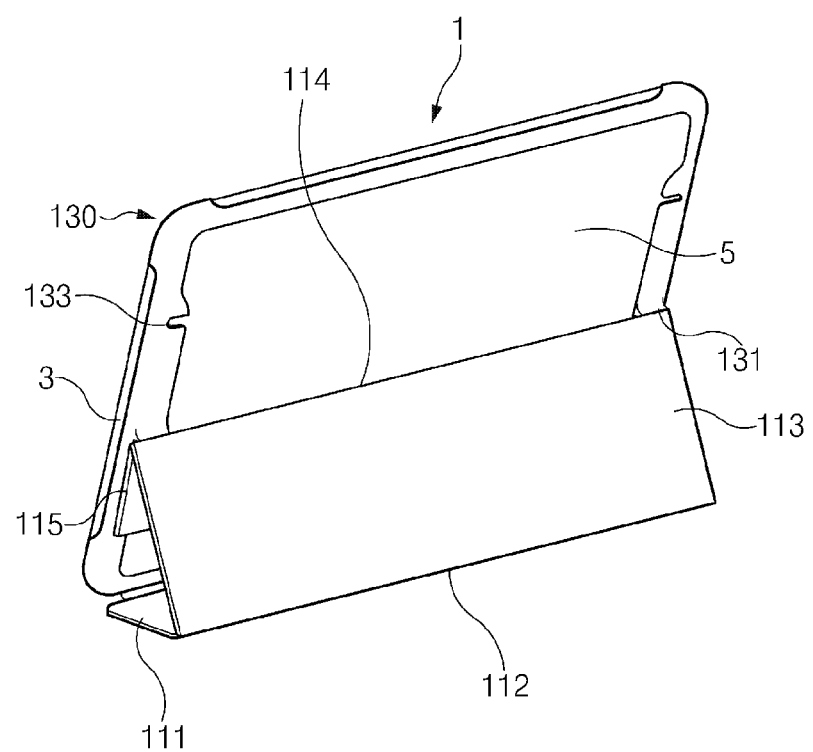
FIG. 5 is a rear perspective view of an electronic device supported by a cover in a first stand mode, according to an embodiment of the present invention.
Figure 6:
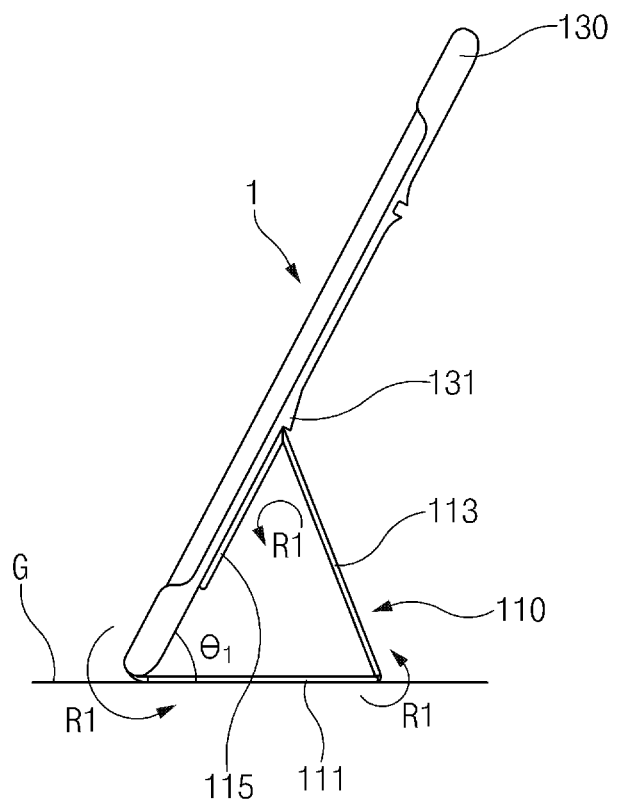
FIG. 6 is a side perspective view of an electronic device supported by a cover in a first stand mode, according to an embodiment of the present invention.

FIG. 4 is a front perspective view of an electronic device supported by a cover in a first stand mode, according to an embodiment of the present invention. FIG. 5 is a rear perspective view of an electronic device supported by a cover in a first stand mode, according to an embodiment of the present invention. FIG. 6 is a side perspective view of an electronic device supported by a cover in a first stand mode, according to an embodiment of the present invention.

Referring to FIGS. 4 to 6, the electronic device cover stands the electronic device 1 in a first stand mode.

In the first stand mode, the electronic device 1 makes an angle $\theta 1$ relative to a surface G on which the electronic device 1 stands. For example, angle $\theta 1$ ranges from 60 to 70 degrees. The first stand mode may be a mode which is advantageous for a user to stand the electronic device 1 and view a movie.

The cover member 110 supports the electronic device 1 in an inclined state where the cover member 110, bent at the bending lines 112 and 114, is caught by the protrusion portion 131. The cover member 110 supports the electronic device 1 in the first stand mode, when a portion at which the bending line 114 between the second plate member 113 and the third plate member 115 of the cover member 110 exists is held by the protrusion portion 131.

In this case, the second plate member 113 is bent relative to the first plate member 111 in a first direction R1, and the third plate member 115 is bent relative to the second plate member 113 in the first direction R1. The first direction R1 is a direction in which the cover member 110 rotates to expose the display portion 7.

Figure 7:
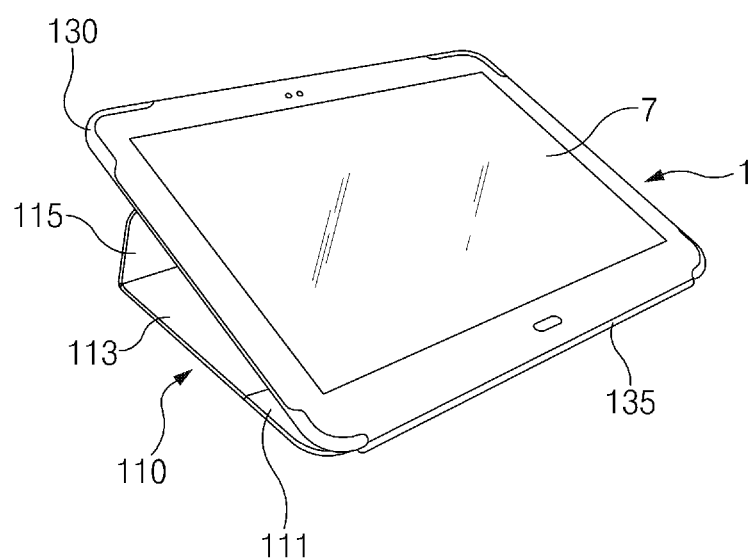
FIG. 7 is a front perspective view of an electronic device supported by a cover in a second stand mode according to an embodiment of the present invention.
Figure 8:
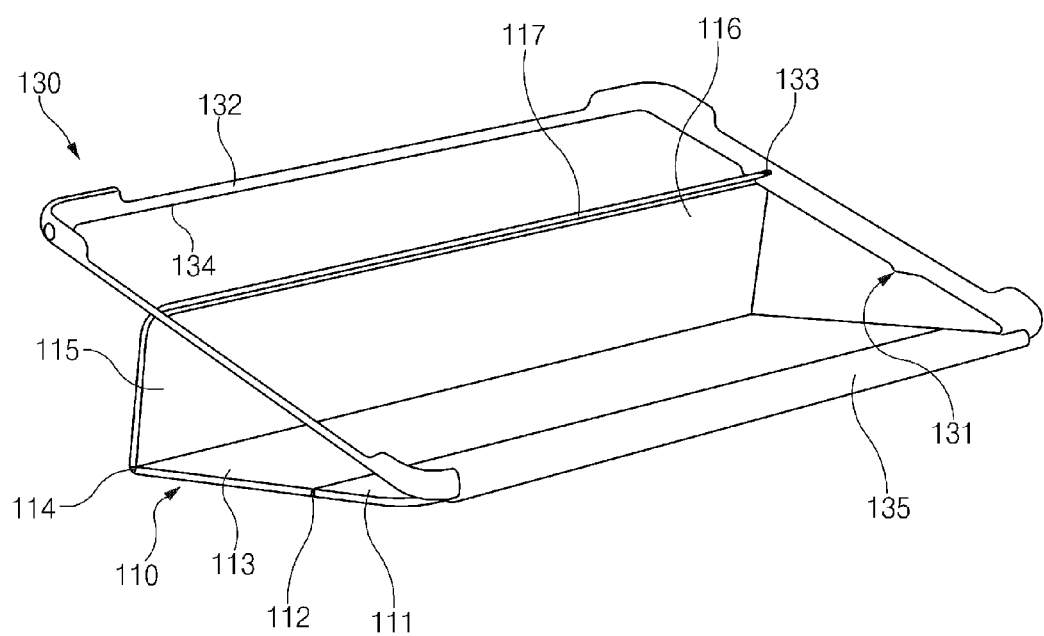
FIG. 8 is a rear perspective view of an electronic device supported by a cover in a second stand mode, according to an embodiment of the present invention.
Figure 9:
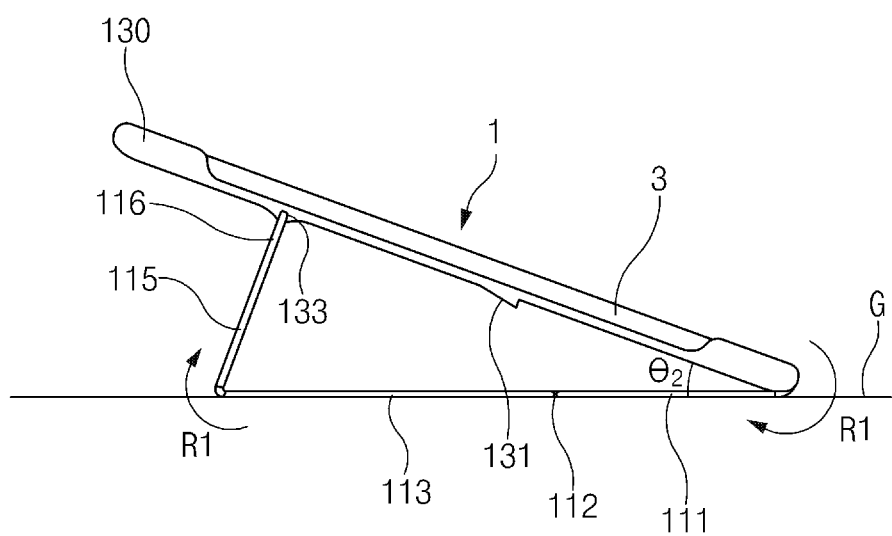
FIG. 9 is a side perspective view of an electronic device supported by a cover in a second stand mode, according to an embodiment of the present invention.

FIG. 7 is a front perspective view of an electronic device supported by a cover in a second stand mode according to an embodiment of the present invention. FIG. 8 is a rear perspective view of an electronic device supported by a cover in a second stand mode, according to an embodiment of the present invention. FIG. 9 is a side perspective view of an electronic device supported by a cover in a second stand mode, according to an embodiment of the present invention.

Referring to FIGS. 7 to 9, the cover member 110 supports the electronic device 1 in an inclined state, where a part of the cover member 110, bent at the bending line 114, is inserted in the groove portion 133. The part is an end portion 116 of the cover member 110.

Specifically, FIG. 8 illustrates a cover for an electronic device, with the electronic device 1 removed. Since the electronic device 1 is removed, in FIG. 8, the end portion 116 being inserted into the groove portion 133 may be illustrated in more detail.

The end portion 116 further includes a core 117 attached along an edge of a cover member 110. The core 117 may be formed of a material having strength greater than that of the cover member 110. The core 117 allows the cover member 110 to support the electronic device 1 more firmly.

Referring to FIG. 9, in a second stand mode, the electronic device 1 makes an angle θ2 relative to the surface G on which the electronic device 1 stands. For example, the angle θ2 ranges from 15 to 25 degrees. The second stand mode may be advantageous for a user to type using a keyboard screen displayed on the display 7 of the electronic device 1.

In the second stand mode, the cover member 110 supports the electronic device 1 in such a way that an end portion 116 is inserted in a groove portion 133, with a second plate member 113 and a third plate member 115 being bent.

In this case, the third plate member 115 is bent relative to the second plate member 113 in a first direction R1 without bending between the first plate member 111 and the second plate member 113. As illustrated in FIG. 9, the first direction R1 is a direction in which the cover member 110 rotates to expose the display 7.

As described above, the electronic device cover may have the protrusion portion 131 or the groove portion 133, thereby standing the electronic device 1 to allow the electronic device 1 to make a predetermined angle relative to the surface G while protecting the electronic device 1.

Compared to the type of cover illustrated in FIGS. 1 to 9, the type of cover illustrated in FIGS. 10 to 18 differs in that a protrusion portion and a groove portion are positioned adjacent to each other.

Figure 10:
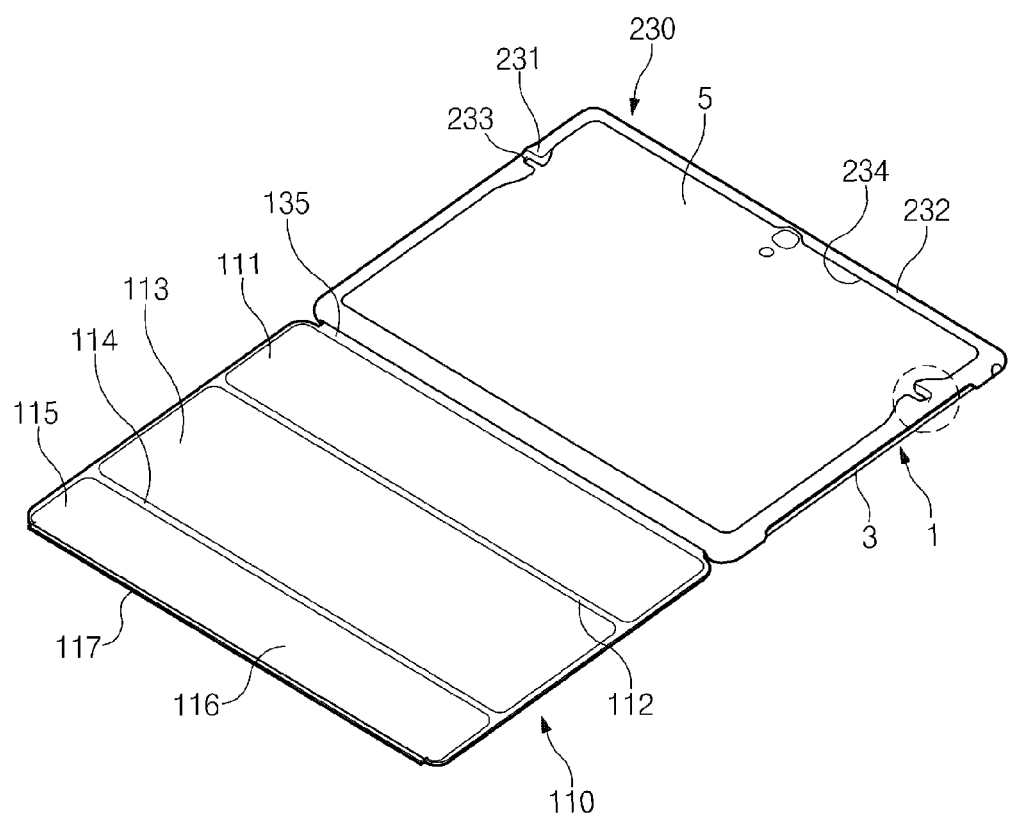
FIG. 10 is a perspective view of a cover for an electronic device, according to an embodiment of the present invention.
Figure 11:
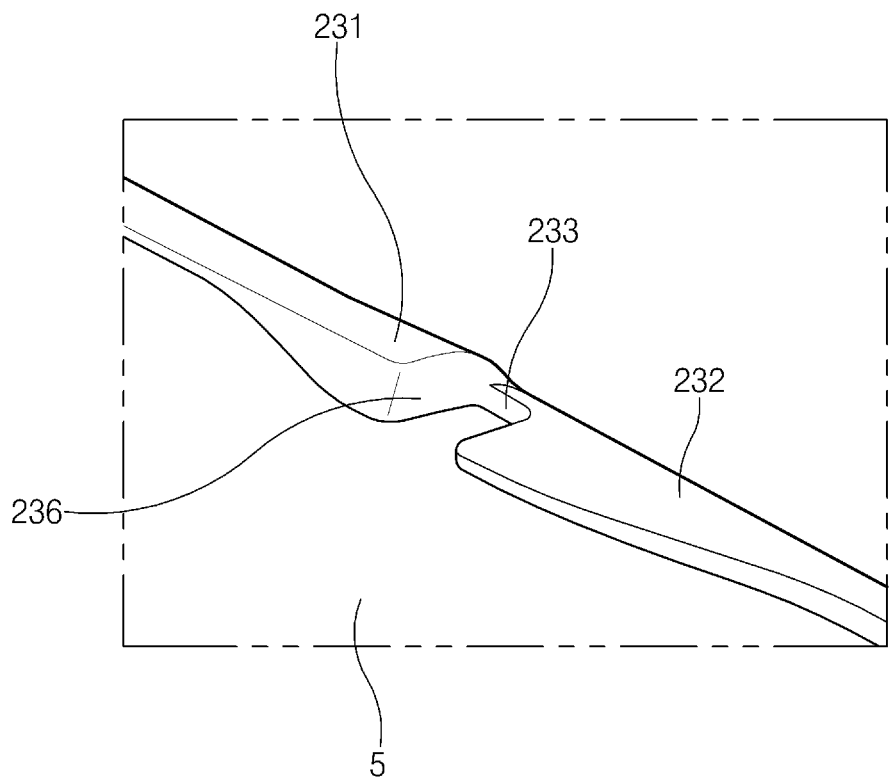
FIG. 11 is an enlarged view of a region in which a protrusion portion and a groove portion of a cover are disposed, according to an embodiment of the present invention.
Figure 12:
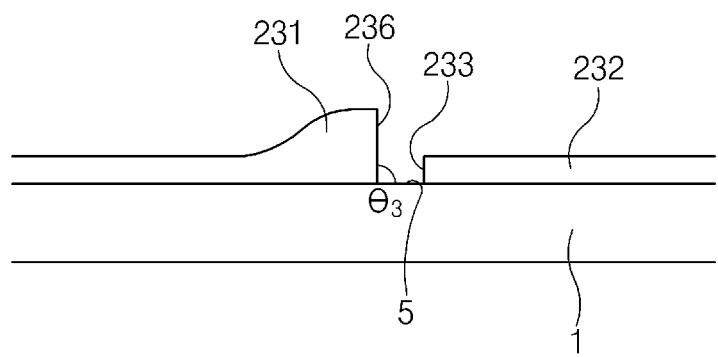
FIG. 12 is a side view of a region in which a protrusion portion and a groove portion of a cover are disposed, according to an embodiment of the present invention.
Figure 13:
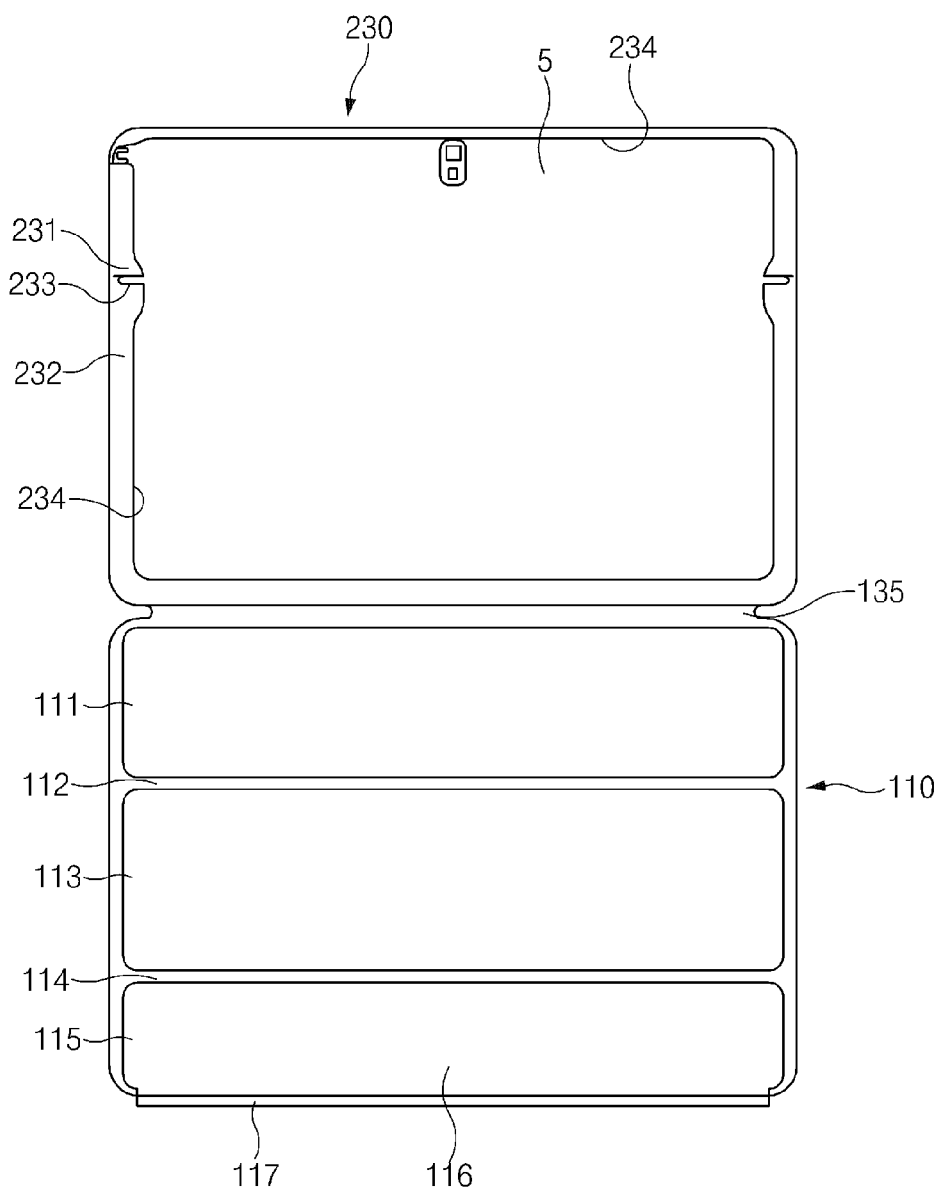
FIG. 13 is a front view of a cover for an electronic device, according to an embodiment of the present invention.
Figure 14:
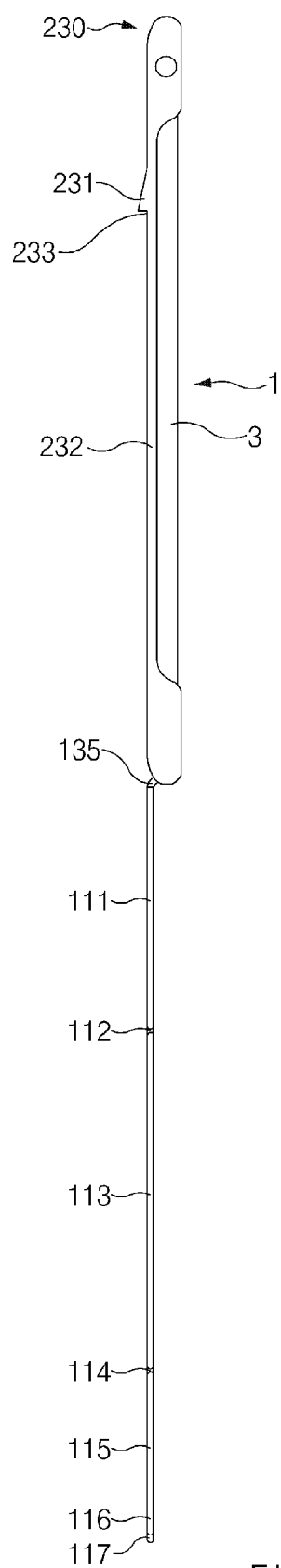
FIG. 14 is a side view of a cover for an electronic device, according to an embodiment of the present invention.

FIG. 10 is a perspective view of a cover for an electronic device, according to an embodiment of the present invention. FIG. 11 is an enlarged view of a region in which a protrusion portion and a groove portion of a cover are disposed, according to an embodiment of the present invention. FIG. 12 is a side view of a region in which a protrusion portion and a groove portion of a cover are disposed, according to an embodiment of the present invention. FIG. 13 is a front view of a cover for an electronic device, according to an embodiment of the present invention. FIG. 14 is a side view of a cover for an electronic device, according to an embodiment of the present invention.

Referring to FIGS. 10 to 14, the electronic device cover includes a protrusion portion 231 and a groove portion 233 which are disposed to be adjacent to each other.

FIG. 14 provides a side view of the cover where the protrusion portion 231 and the groove portion 233 are illustrated as being positioned adjacent to each other.

As shown in FIGS. 11 and 12, the holding surface 236 is a surface of the protrusion portion 231, at which a cover member 110 is held. The protrusion portion 231 and the groove portion 233 are positioned adjacent to each other to allow the holding surface 236 to become a side surface directly forming the groove portion 233.

When the protrusion portion 231 and the groove portion 233 are positioned adjacent to each other, a user may easily switch between a first stand mode, to be implemented through the protrusion portion 231, and a second stand mode, to be implemented through the groove portion 233.

Figure 15:
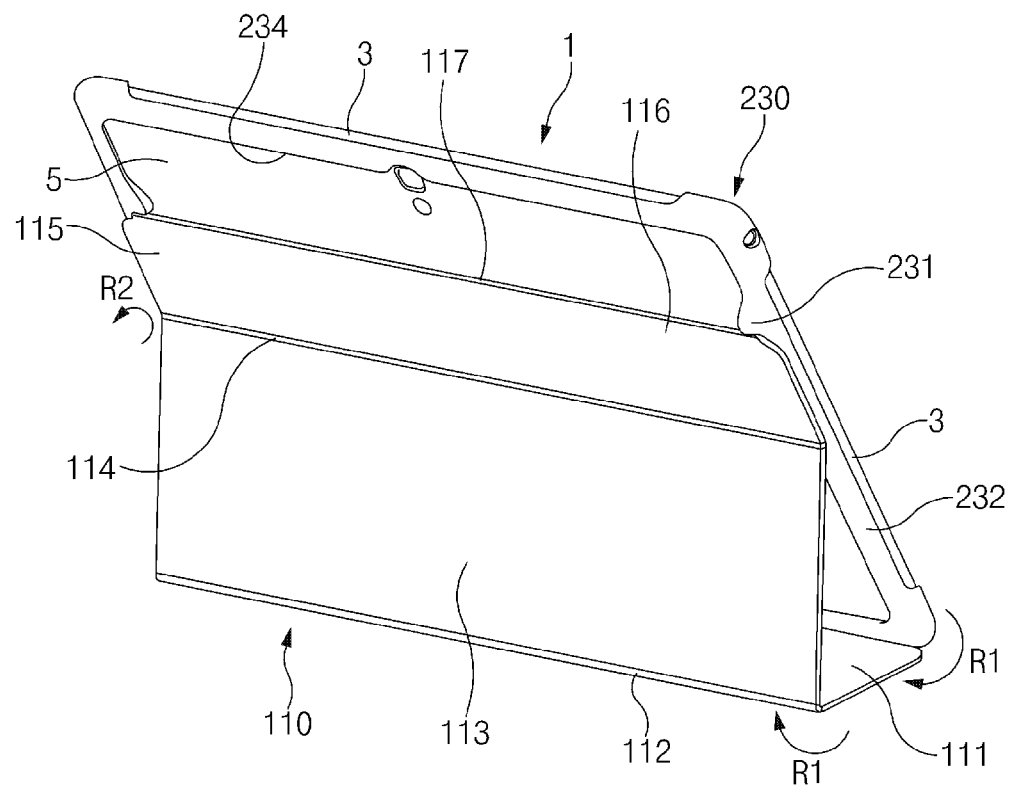
FIG. 15 is a perspective view of a cover for an electronic device supporting the electronic device in a first stand mode, according to an embodiment of the present invention.
Figure 16:
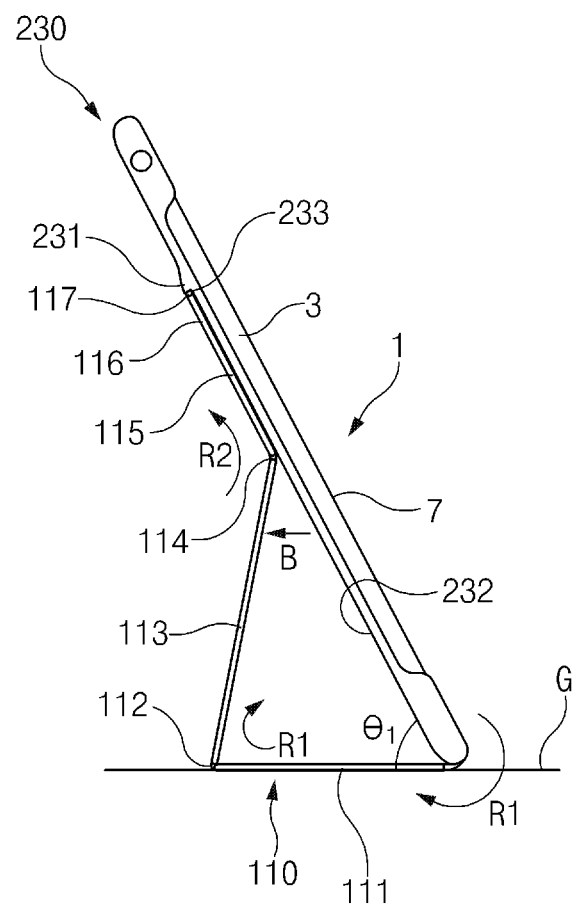
FIG. 16 is a side view of a cover for an electronic device supporting the electronic device in a first stand mode, according to an embodiment of the present invention.
Figure 17:
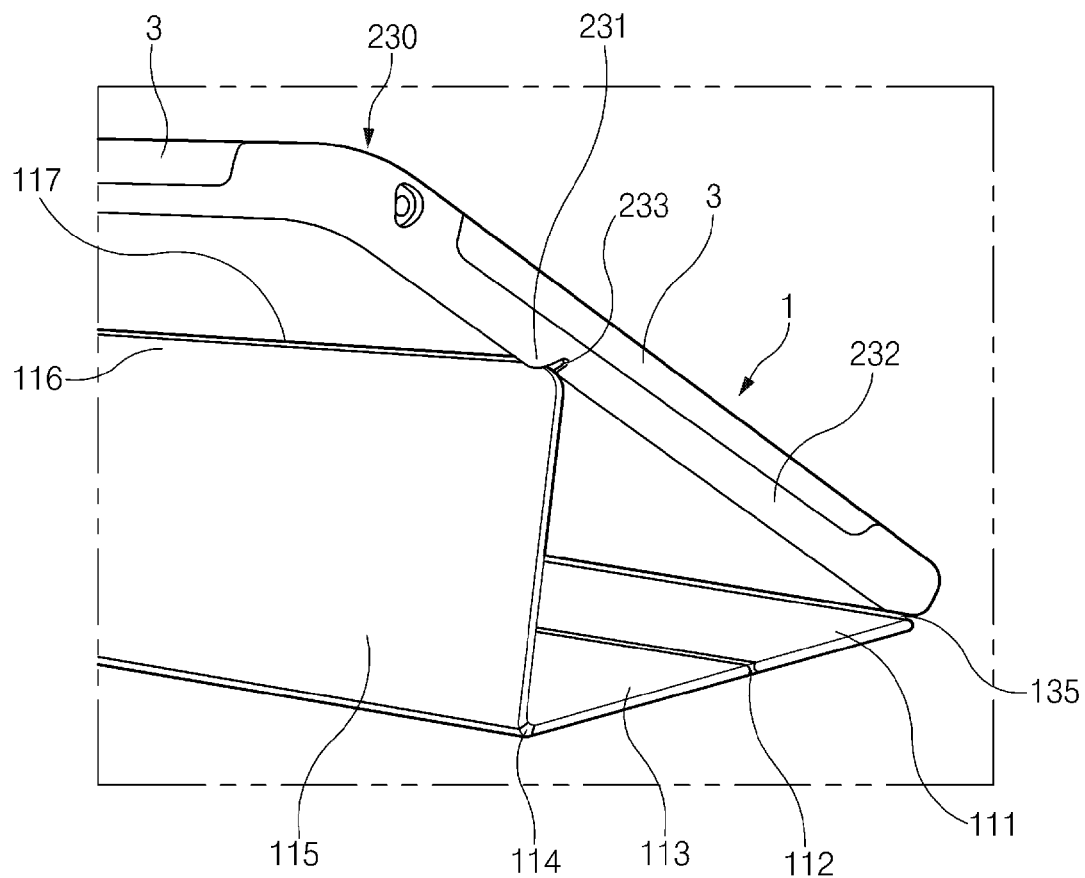
FIG. 17 is a perspective view of a cover for an electronic device supporting the electronic device in a second stand mode, according to an embodiment of the present invention.
Figure 18:
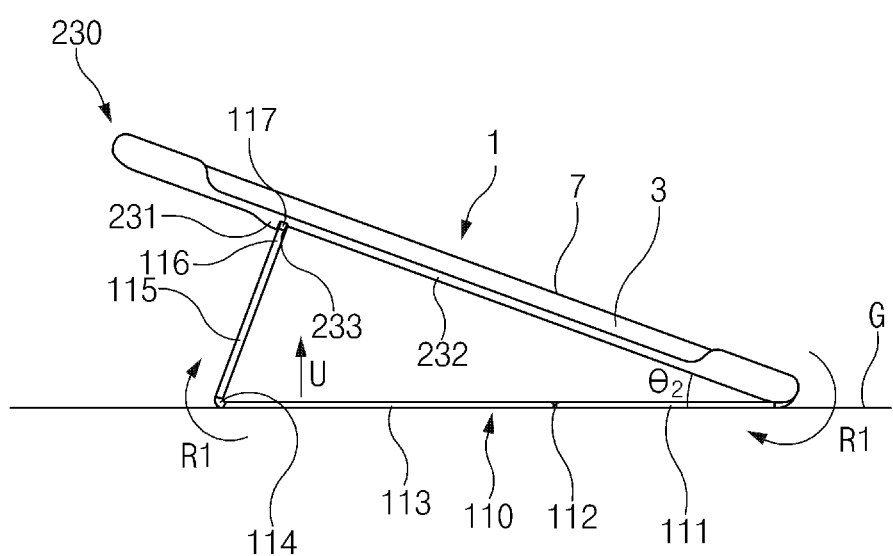
FIG. 18 is a side view of a cover for an electronic device supporting the electronic device in a second stand mode, according to an embodiment of the present invention.

FIG. 15 is a perspective view of a cover for an electronic device supporting the electronic device in a first stand mode, according to an embodiment of the present invention. FIG. 16 is a side view of a cover for an electronic device supporting the electronic device in a first stand mode, according to an embodiment of the present invention. FIG. 17 is a perspective view of a cover for an electronic device supporting the electronic device in a second stand mode, according to an embodiment of the present invention. FIG. 18 is a side view of a cover for an electronic device supporting the electronic device in a second stand mode, according to an embodiment of the present invention Referring to FIGS. 15 and 16, the electronic device cover stands the electronic device 1 in the first stand mode.

In the first stand mode, is the electronic device 1 makes an angle θ1 relative to a surface G on which the electronic device 1 is stands. For example, the angle θ1 ranges from 60 to 70 degrees. The first stand mode may be a mode which is advantageous for a user to view a movie.

As illustrated in FIGS. 15 and 16, the cover supports the electronic device 1 in an inclined state where an end portion 116 of the cover member 110 bent at bending lines 112 and 114 is caught by the protrusion portion 231.

The end portion 116 may further include a core 117 attached along an edge of the cover member 110. The core 117 may be formed of a material having strength greater than that of the cover member 110. In the case where the core 117 is provided, a portion held by the protrusion portion 231 is the core 117. As the core 117 is caught by the protrusion portion 231, the cover member 110 supports the electronic device 1 in the first stand mode.

In the first stand mode, a second plate member 113 is bent relative to a first plate member 111 in a first direction R1, and a third plate member 115 is bent relative to the second plate member 113 in a second direction R2.

As illustrated in FIG. 16, the first direction R1 is a direction in which the cover member 110 rotates to expose a display portion 7, and the second direction R2 is a direction opposite to the first direction R1.

The third plate member 115 contacts a rear frame 232. The bending line 114 and the third plate member 115 may support the electronic device 1. The core 117 may provide additional support for the electronic device 1 at the end portion 116 of the cover member 110. Accordingly, the electronic device cover firmly supports the electronic device 1 in the first stand mode.

Referring back to FIG. 12, the protrusion portion 231 has a holding surface 236 at which the cover member 110 is held. The end portion 116 of the cover member 110, in particular, the core 117 is held by the holding surface 236. An angle θ3 that a rear surface 5 of the electronic device 1 makes relative to the holding surface 236 is 90 degrees or less. As the angle θ3 that the rear surface 5 of the electronic device 1 makes relative to the holding surface 236 becomes less than 90 degrees, it may be difficult to pull the end portion 116 of the cover member 110 out of the protrusion portion 231. Thus, the angle θ3 may be set to less than 90 degrees to prevent the first stand mode from being released easily.

FIG. 17 is a perspective view of a cover for an electronic device supporting the electronic device in a state of a second stand mode, according to an embodiment of the present invention. FIG. 18 is a side view of a cover for an electronic device supporting the electronic device in a state of a second stand mode, according to an embodiment of the present invention; Referring to FIGS. 17 and 18, the electronic device cover stands the electronic device 1 in a second stand mode.

In the second stand mode, the electronic device 1 makes an angle θ2 relative to the surface G on which the electronic device 1 is stands. For example, the angle θ2 ranges from 15 to 25 degrees. The second stand mode may be a mode which is advantageous for a user to type using a keyboard screen displayed on a display portion 7 of the electronic device 1.

In the second stand mode, the cover member 110 supports the electronic device 1 in the second mode where the bending line 114 between a third plate member 115 and a second plate member 113 is bent in such a way that an end portion 116 of the cover member 110, in particular, the core 117 is inserted in a groove portion 233.

The third plate member 115 is bent relative to the second plate member 113 in a first direction R1 without bending between a first plate member 111 and the second plate member 113.

As illustrated in FIG. 18, the first direction R1 is a direction in which the cover member 110 rotates to expose the display portion 7.

As shown in FIGS. 16 and 18, as a protrusion portion 231 and a groove portion 233 are positioned adjacent to each other, allowing the electronic device cover to be easily transformed from the first stand mode to the second stand mode.

In particular, in the first stand mode, as illustrated in FIG. 16, an upper end of the second plate member 113 is backwardly pushed, with the core 117 contacting the protrusion portion 231, and then, the third plate member 115 is detached from a rear frame 232. The third plate member 115 rotates with the core 117 at the center to allow the core 117 to be inserted in the groove portion 233. The second plate member 113 rotates toward a surface G with the bending line 112 at the center to be in contact with the surface G, and the third plate member 115 supports the electronic device 1 through the end portion 116 of the cover member 110, with the second plate member 113 being bent relative to the second plate member 113 in the first direction R1 (as illustrated in FIG. 18). The cover member 110 supports the electronic device 1, with the core 117 being inserted in the groove portion 233. Accordingly, the first stand mode, illustrated in FIG. 16, may be easily changed into the second stand mode, illustrated in FIG. 18.

Changing of the second stand mode of FIG. 18 into the first stand mode of FIG. 16 may be accomplished by performing, in reverse, the above-described method of changing the first stand mode into the second stand mode.

In particular, the second plate member 113 may be lifted upwardly (U) with the bending line 112 at the center to allow the second plate member 113 to rotate. At the same time, the third plate member 115 rotates with the core 117, inserted into the groove portion 233, at the center to allow the third plate member 115 to be in contact with a rear frame 232. The core 117 may then be smoothly hooked by the protrusion portion 231. Accordingly, as illustrated in FIG. 16, the bending line 114 and the third plate member 115 support the rear frame 232 of the electronic device 1, and the core 117 may then provide additional support for the electronic device 1 at the end portion of the cover member 110. In this way, the second stand mode may be easily transformed into the first stand mode.

The electronic device cover illustrated in FIGS. 1 to 9, may further be configured to include a groove portion without a protrusion portion.

Accordingly, a description will be provided for the electronic device cover illustrated in FIGS. 1 to 3 and 7 to 9 excluding the protrusion portion.

Under the above-described assumption (excluding the protrusion portion 131), referring to FIGS. 1 to 3 and 7 to 9, an electronic device cover includes the groove portion 133 that penetrates a rear frame 130 toward a direction closest to a rear surface 5 of the electronic device 1. In this case, the electronic device cover merely includes the groove portion 133, without the protrusion portion 131.

A cover member 110 supports the electronic device 1 where a portion of a cover member 110 bent at a bending line is inserted in the groove portion 133. The portion is an end portion 116 of the cover member 110.

The end portion 116 further includes a core 117 attached along an edge of the cover member 110. The core 117 may be formed of a material having a strength greater than that of the cover member 110. The core 117 allows the cover member 110 to firmly support the electronic device 1.

The groove portion 133 penetrates a rear frame 130 where one side facing a center hole 134 is opened, and is disposed at both sides with the center hole 134 at the center.

Referring to FIGS. 7 to 9, the electronic device cover supports the electronic device 1 in a second stand mode. In the second stand mode the cover supports the electronic device 1 makes an angle relative to a surface G on which the electronic device 1 is stands. For example, the angle θ2 ranges from 15 to 25 degrees.

As described above, the electronic device cover may have a groove portion 133 which allows the cover to be detachable from the electronic device 1, thereby making it possible to support the electronic device 1 to allow the electronic device 1 to make a predetermined angle relative to the surface G while protecting the electronic device 1.

Hereinafter, an embodiment of an electronic device to which the above-described cover is applicable will be described.

Figure 19:
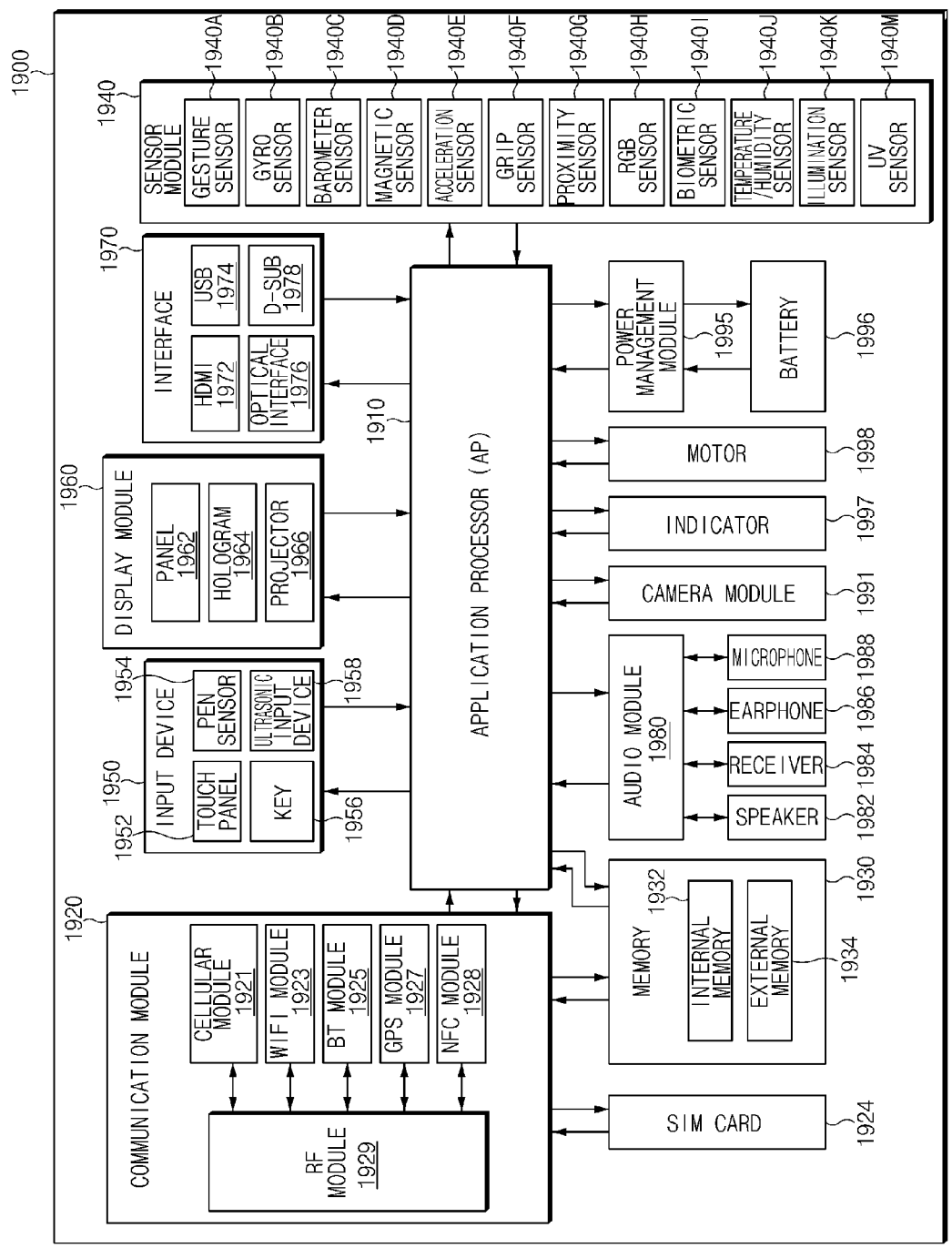
FIG. 19 is a block diagram illustrating an electronic device according to an embodiment of the present invention.

FIG. 19 is a block diagram illustrating an electronic device 1900, according to an embodiment of the present invention. An electronic device 1900 includes a part or all of components of an electronic device 1 shown in FIG. 1.

Referring to FIG. 19, the electronic device 1900 includes one or more application processors (AP) 1910, a communication module 1920, a subscriber identification module (SIM) card 1924, a memory 1930, a sensor module 1940, an input device 1950, a display module 1960, an interface 1970, an audio module 1980, a camera module 1991, a power management module 1995, a battery 1996, an indicator 1997, and a motor 1998.

The AP 1910 may drive an operating system (OS) or an application to control a plurality of hardware or software components connected to the AP 1910, and may process and compute a variety of data including multimedia data. The AP 1910 is implemented with a System on Chip (SoC), for example. According to an embodiment of the present invention, the AP 1910 may further include a graphic processing unit (GPU, not illustrated).

The communication module 1920 transmits and receives data when there are conveyed communications between other electronic devices connected with the electronic device 1900 through a network. The communication module 1920 may include a cellular module 1921, a Wi-Fi module 1923, a Bluetooth (BT) module 1925, a GPS module 1927, a Near Field Communication (NFC) module 1928, and a Radio Frequency (RF) module 1929.

The cellular module 1921 may provide voice communication, video communication, a character service, an Internet service, and the like through a communication network (e.g., a Long Term Evolution (LTE), LTE-A, Code Division Multiple Access (CDMA), Wideband CDMA (WCDMA), Universal Mobile Telecommunication System (UMTS), Wireless Broadband (WiBro), and Global System for Mobile communication (GSM), or the like). Also, the cellular module 1921 may perform authentication of an electronic device within a communication network using, for example, a SIM (e.g., a SIM card 1924). The cellular module 1921 may perform at least a portion of functions that the AP 1910 provides. For example, the cellular module 1921 may perform at least a portion of a multimedia control function.

The cellular module 1921 may include a communication processor (CP). Also, the cellular module 1921 may be implemented with, for example, a SoC.

The AP 1910 or the cellular module 1921 (e.g., a CP) may load, on a volatile memory, a command or data received from at least one of a nonvolatile memory and another element connected to the AP 1910 or the cellular module 1921, so as to process the command or data. Furthermore, the AP 1910 or the cellular module 1921 may store, in the nonvolatile memory, data received from or generated by at least one of the other elements.

Each of the Wi-Fi module 1923, the BT module 1925, the GPS module 1927, and the NFC module 1928 may include a processor for processing data exchanged through a corresponding module.

At least a portion (e.g., two or more components) of the cellular module 1921, the Wi-Fi module 1923, the BT module 1925, the GPS module 1927, and the NFC module 1928 may be included within one Integrated Circuit (IC) or an IC package. For example, at least a portion (e.g., a communication processor corresponding to the cellular module 1921 and a Wi-Fi processor corresponding to the Wi-Fi module 1923) of communication processors corresponding to the cellular module 1921, the Wi-Fi module 1923, the BT module 1925, the GPS module 1927, and the NFC module 1928 is implemented with one SoC.

The RF module 1929 transmits/receives data. For example, the RF module 1929 transmits/receives an RF signal. A transceiver, a power amplifier module (PAM), a frequency filter or low noise amplifier (LNA) may be included in the RF module 1929. Furthermore, the RF module 1929 may further include a component, such as a conductor or a wire for transmitting/receiving free-space electromagnetic waves in a wireless communication system.

At least one of the cellular module 1921, the Wi-Fi module 1923, the BT module 1925, the GPS module 1927, or the NFC module 1928 may transmit and receive an RF signal through an additional RF module.

The SIM card 1924 is a card that includes a SIM, and is inserted to a slot formed at a specific position of the electronic device. The SIM card 1924 includes unique identify information (e.g., an Integrated Circuit Card Identifier (ICCID)) or subscriber information (e.g., Integrated Mobile Subscriber Identity (IMSI)).

The memory 1930 includes an embedded memory 1932 or an external memory 1934. For example, the embedded memory 1932 may include at least one of a volatile memory (e.g., a Dynamic Random Access Memory (DRAM), a Static RAM (SRAM), or a Synchronous DRAM (SDRAM)) and a nonvolatile memory (e.g., a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, or a NOR flash memory).

The internal memory 1932 may be a solid state drive (SSD).

The external memory 1934 includes a flash drive, for example, Compact Flash (CF), Secure Digital (SD), Micro Secure Digital (Micro-SD), Mini Secure Digital (Mini-SD), extreme Digital (xD) or a memory stick. The external memory 1934 is functionally connected to the electronic device 1900 through various interfaces. The electronic device 1900 may further include a storage device (or a storage medium), such as a hard drive.

The sensor module 1940 measures a physical quantity or detects an operation state of the electronic device 1900. The sensor module 1940 converts the measured or detected information to an electric signal. The sensor module 1940 may include, for example, at least one of a gesture sensor 1940A, a gyro sensor 1940B, a pressure sensor 1940C, a magnetic sensor 1940D, an acceleration sensor 1940E, a grip sensor 1940F, a proximity sensor 1940G, a color sensor 1940H (e.g., Red, Green, Blue (RGB) sensor), a biometric sensor 1940I, a temperature/humidity sensor 1940J, an illuminance sensor 1940K, or an ultraviolet (UV) sensor 1940M. Additionally, the sensor module 1940 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, a fingerprint sensor, and the like. The sensor module 1940 may further include a control circuit for controlling at least one or more sensors included therein.

The input device 1950 includes a touch panel 1952, a (digital) pen sensor 1954, a key 1956, or an ultrasonic input unit 1958.

The touch panel 1952 recognizes a touch input using at least one of capacitive, resistive, infrared, and ultrasonic detecting methods. Furthermore, the touch panel 1952 may include a control circuit. In the case of using the capacitive detecting method, a physical contact recognition or proximity recognition is allowed. The touch panel 1952 may further include a tactile layer. In this case, the touch panel 1952 provides a tactile reaction to a user. The touch panel 1952 generates a touch event associated with execution of a specific function using position associated information.

The (digital) pen sensor 1954 may be implemented in a similar or same manner as the method of receiving a touch input of a user or may be implemented using an additional sheet for recognition.

The key 1956 may include, for example, a physical button, an optical key, a keypad, and the like.

The ultrasonic input device 1958, which is an input device for generating an ultrasonic signal, enables the electronic device 1900 to detect a sound wave through a microphone (e.g., a microphone 1988) to identify data. The ultrasonic input device 1958 is capable of wireless recognition.

The electronic device 1900 may use the communication module 1920 to receive a user input from an external device (e.g., a computer or server) connected to the communication module 1920.

The display module 1960 includes a panel 1962, a hologram device 1964, or a projector 1966.

The panel 1962 may be a liquid-crystal display Liquid-Crystal Display (LCD) or an active-matrix organic light-emitting diode Active-Matrix Organic Light-Emitting Diode (AMOLED). The panel 1962 may be flexible, transparent, or wearable. The panel 1962 and the touch panel 1952 may be integrated into a single module.

The hologram device 1964 displays a stereoscopic image in the air using light interference.

The projector 1966 projects light onto a screen so as to display an image. The screen may be arranged in the inside or the outside of the electronic device 1900. The display module 1960 may further include a control circuit for controlling the panel 1962, the hologram device 1964, or the projector 1966.

The interface 1970 includes, for example, an High-Definition Multimedia interface (HDMI) 1972, a Universal Serial Bus (USB) 1974, an optical interface 1976, or a D-subminiature (D-sub) 1978. The interface 1970 may include a mobile high definition link (MHL) interface, a SD card/multi-media card (MMC) interface, or an infrared data association (IrDA) standard interface.

The audio module 1980 converts a sound and an electric signal in dual directions. The audio module 1980 processes sound information that is input or output through a speaker 1982, a receiver 1984, an earphone 1986, or a microphone 1988.

The camera module 1991 for shooting a still image or a video may include at least one image sensor (e.g., a front sensor or a rear sensor), a lens, an Image Signal Processor (ISP), or a flash (e.g., an LED or a xenon lamp).

The power management module 1995 manages power of the electronic device 1900. The Power Management Integrated Circuit (PMIC) a charger IC, or a battery gauge is included in the power management module 1995.

The PMIC is mounted on an integrated circuit or a SoC semiconductor. A charging method may be classified into a wired charging method and a wireless charging method. The charger IC charges a battery, and prevents an overvoltage or an overcurrent from being introduced from a charger. The charger IC includes a charger IC for at least one of the wired charging method and the wireless charging method. The wireless charging method includes, for example, a magnetic resonance method, a magnetic induction method or an electromagnetic method, and may include an additional circuit, for example, a coil loop, a resonant circuit, or a rectifier, and the like.

The battery gauge measures a remaining capacity of the battery 1996 and a voltage, current or temperature thereof while the battery is charged.

The battery 1996 stores or generates electricity, and supplies power to the electronic device 1900 using the stored or generated electricity. The battery 1996 may include, for example, a rechargeable battery or a solar battery.

The indicator 1997 displays a specific state of the electronic device 1900 or a part thereof (e.g., the AP 1910), such as a booting state, a message state, a charging state, and the like.

The motor 1998 converts an electrical signal into a mechanical vibration. A processing device (e.g., a Graphical Processing Unit (GPU)) for supporting a mobile TV may be included in the electronic device 1900. The processing device for supporting a mobile TV processes media data according to the standards of Digital Multimedia Broadcasting (DMB), Digital Video Broadcasting (DVB), or media flow.

According to various embodiments of the present invention, each of the above-mentioned elements of the electronic device may be configured with one or more components, and the names of the elements may be changed according to the type of the electronic device. The electronic device may include at least one of the above-mentioned elements, and some elements may be omitted or other additional elements may be added. Furthermore, some of the elements of the electronic device may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an Application-Specific Integrated Circuit (ASIC) chip, a Field-Programmable Gate Array (FPGA), and a programmable-logic device for performing some operations, which are known or will be developed.

As described above, an electronic device cover has a groove portion which allows the cover to be detachable from the electronic device, making it possible to support the electronic device to allow the electronic device to make a predetermined angle relative to the surface on which the electronic device stands, while protecting the electronic device.

While the present invention has been shown and described with reference to various embodiments thereof, it will be understood by those skilled in the art that various changes in form and details is made therein without departing from the spirit and scope of the present invention as defined by the appended claims and their equivalents.

What is claimed is:

1. A cover for an electronic device, the cover comprising:
   a frame that is detachably coupled to the electronic device at least one of a side surface and a rear surface of the electronic device;
   a cover member that is rotatably connected to one side of the frame and bendable on at least one bending line included therein; and
   a first protrusion portion and a second protrusion portion that protrude from the frame,
   wherein the cover member supports the electronic device at an incline, when the cover member is bent along the at least one bending line and the first protrusion portion and the second protrusion portion simultaneously rest on an edge of the cover member,
   wherein the frame comprises a rear frame which contacts the rear surface of the electronic device,
   wherein the rear frame comprises a center hole penetrating a center area of the rear frame,
   wherein the first protrusion portion is positioned at one side with the center hole at a center and the second protrusion portion is positioned at the other side with the center hole at the center.

2. The cover of claim 1, wherein the first protrusion portion and the second protrusion portion have a holding surface where the cover member is held, and
   wherein an angle which the holding surface makes relative to the rear surface of the electronic device is less than 90 degrees.

3. The cover of claim 1, wherein an end portion of the cover member is held by the first protrusion portion and the second protrusion portion to allow the cover member to support the electronic device in an inclined state.

4. The cover of claim 3, wherein the end portion further comprises:
   a core attached along an edge of the cover member, and
   wherein a strength of the core is greater than a strength of the cover member.

5. The cover of claim 1, wherein the electronic device is supported in a stand mode in which the electronic device makes a tilt angle of 60 to 70 degrees relative to a surface on which the electronic device is lying.

6. The cover of claim 1, wherein the cover member comprises:
   two bending lines, parallel with the one side of the frame, and
   a first plate member, a second plate member, and a third plate member,
   wherein a first bending line, of the two bending lines, is disposed between the first plate member and the second place member and a second bending line, of the two bending lines, is disposed between the second plate member and the third plate member; and wherein the second plate member is bent in a first direction relative to the first plate member, the third plate member is bent in the first direction relative to the second plate member, and the first direction is a direction in which the cover member rotates to expose a display unit.

7. The cover of claim 1, wherein the cover member comprises:
  two bending lines, parallel with the one side of the frame, and
  a first plate member, a second plate member, and a third plate member,
  wherein a first bending line, of the two bending lines, is disposed between the first plate member and the second place member and a second bending line, of the two bending lines, is disposed between the second plate member and the third plate member, and
  wherein the second plate member is bent in a first direction relative to the first plate member, the third plate member is bent in a second direction relative to the second plate member, the first direction is a direction in which the cover member rotates to expose a display unit, and the second direction is a direction opposite to the first direction.

8. The cover of claim 1, wherein the frame further comprises:
  a groove portion penetrating the rear frame when one side facing the center hole is opened, and
  wherein the cover member supports the electronic device at an incline, when a portion of the cover member is bent along the at least one bending line and is inserted in the groove portion.

9. The cover of claim 8, wherein the portion of the cover member is an end portion of the cover member.

10. The cover of claim 8, wherein the groove portion is positioned at both sides with the center hole at the center.

11. The cover of claim 8, wherein one of the first protrusion portion and the second protrusion portion and the groove portion are positioned adjacent to each other.

12. The cover of claim 8, wherein the electronic device is supported in a stand mode in which the electronic device makes a tilt angle of 15 to 25 degrees relative to a surface on which the electronic device stands.

13. The cover of claim 8, wherein the cover member comprises:
  two bending lines, parallel with the one side of the frame, and
  a first plate member, a second plate member, and a third plate member,
  wherein a first bending line, of the two bending lines, is disposed between the first plate member and the second place member and a second bending line, of the two bending lines, is disposed between the second plate member and the third plate member, and
  wherein the third plate member is bent in a first direction relative to the second plate member, and the first direction is a direction in which the cover member rotates to expose a display unit.

* * * * *